US008396273B2

United States Patent
Li et al.

(10) Patent No.: US 8,396,273 B2
(45) Date of Patent: Mar. 12, 2013

(54) NOISE REDUCTION METHOD FOR DUAL-ENERGY IMAGING

(75) Inventors: Baojun Li, Sharon, MA (US); Naveen Stephan Chandra, Kenosha, WI (US); Jed Douglas Pack, Glenville, NY (US); Jiang Hsieh, Brookfield, WI (US); Xiaoye Wu, Rexford, NY (US); Mary Sue Kulpins, Brookfield, WI (US)

(73) Assignee: General Electric Company, Schenectady, NY (US)

( * ) Notice: Subject to any disclaimer, the term of this patent is extended or adjusted under 35 U.S.C. 154(b) by 599 days.

(21) Appl. No.: 12/650,116

(22) Filed: Dec. 30, 2009

(65) Prior Publication Data

US 2011/0158498 A1    Jun. 30, 2011

(51) Int. Cl.
*G06K 9/00* (2006.01)
(52) U.S. Cl. ........................... 382/130; 382/131
(58) Field of Classification Search .................. 382/128, 382/130, 131, 132, 133; 378/5, 16, 62
See application file for complete search history.

(56) References Cited

U.S. PATENT DOCUMENTS

| | | | |
|---|---|---|---|
| 2005/0100208 A1* | 5/2005 | Suzuki et al. | 382/157 |
| 2005/0180541 A1* | 8/2005 | Avinash et al. | 378/5 |
| 2009/0279761 A1* | 11/2009 | Fei et al. | 382/130 |

OTHER PUBLICATIONS

Alvarez, Robert et al.; "A comparison of Noise and Dose in Conventional and Energy Selective Computed Tomography"; IEEE Transactions for Nuclear Science, vol. NS-26, No. 2, Apr. 1979.
Kalender, Willi A., "An Algorithm for Noise Suppression in Dual Energy CT Material Density Images", IEEE Transaction on Medical Imaging, vol. 7, No. 3, Sep. 1988, pp. 218-224.

* cited by examiner

*Primary Examiner* — Hoon Song
(74) *Attorney, Agent, or Firm* — Fletcher Yoder, P.C.

(57) ABSTRACT

A method is provided that includes acquiring a first set of image data from X-rays produced at a first energy level and a second set of image data from X-rays produced at a second energy level. The method includes generating a first noise mask for a first basis material and a second noise mask for a second basis material and removing pixels corresponding to cross contaminating structural information from the first noise mask and the second noise mask. The method includes processing a first materially decomposed image generated from the first set of image data and the second set of digital data using the second noise mask after removal of the cross contaminating structural information and processing a second MD image generated from the first set of image data and the second set of digital data using the first noise mask after removal of the cross contaminating structural information.

20 Claims, 5 Drawing Sheets

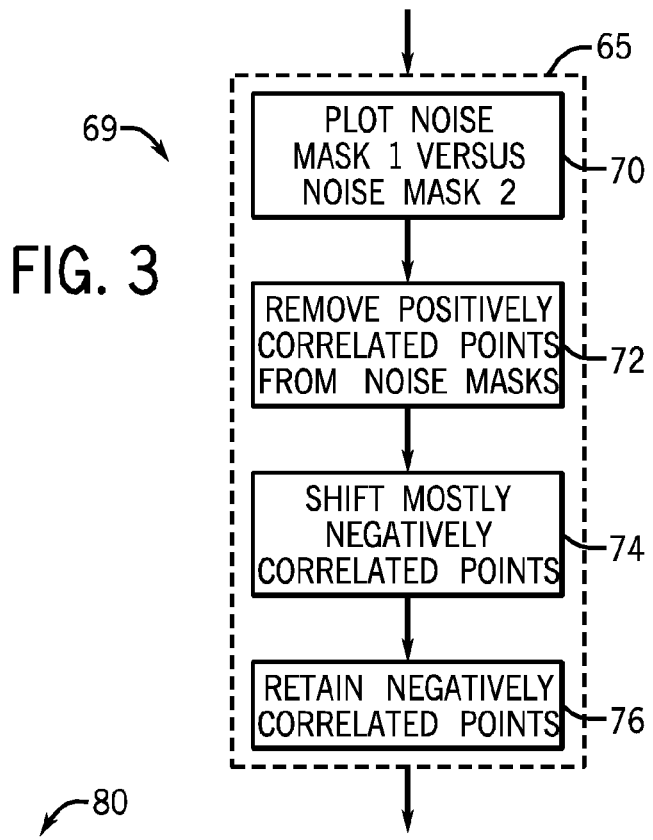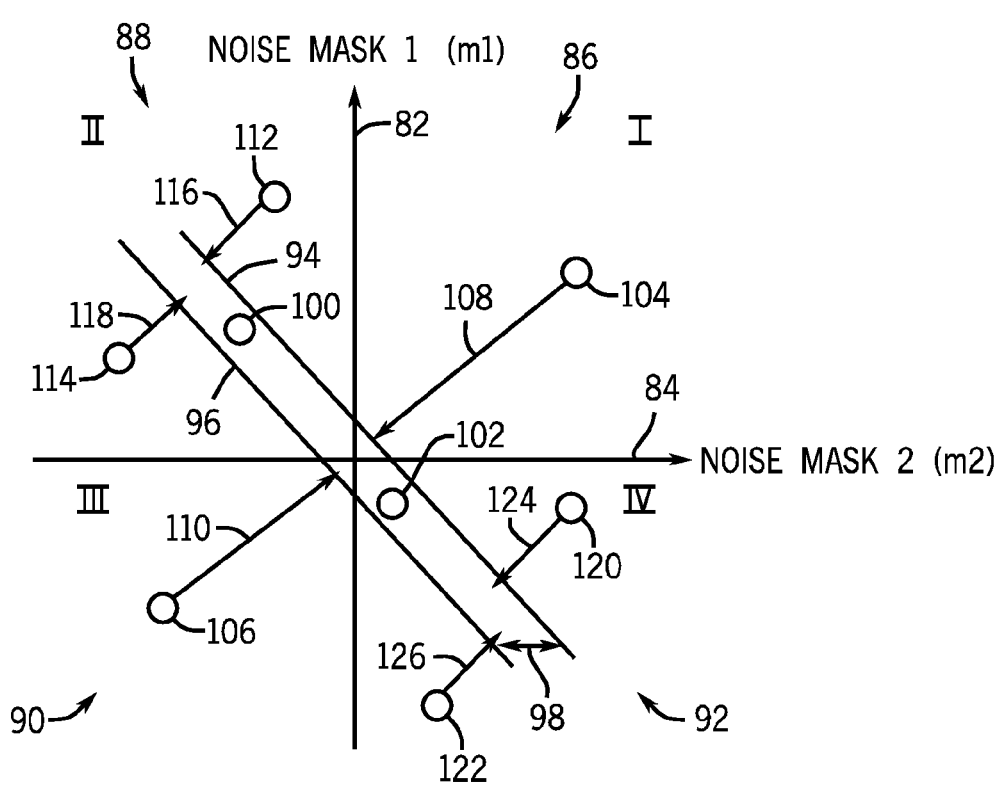

NOISE REDUCTION METHOD FOR DUAL-ENERGY IMAGING

BACKGROUND OF THE INVENTION

The subject matter disclosed herein relates to non-invasive imaging and, in particular, to the use of dual-energy imaging.

In the fields of medical imaging and security screening, non-invasive imaging techniques have gained importance due to benefits that include unobtrusiveness, convenience, and speed. In medical and research contexts, non-invasive imaging techniques are used to image organs or tissues beneath the surface of the skin. Similarly, in industrial or quality control (QC) contexts, non-invasive imaging techniques are used to examine parts or items for hidden defects that may not be evident from an external examination. In security screening, non-invasive imaging techniques are typically used to examine the contents of containers (e.g., packages, bags, or luggage) without opening the containers and/or to screen individuals entering or leaving a secure location.

A number of non-invasive imaging modalities exist today. One such technique, dual-energy (DE) radiography, involves the acquisition of two X-ray images at different energies within a relatively small time interval. The two images are then used to decompose the imaged anatomy and create a first image of a first material (e.g., water) and a second image of a second material (e.g., iodine). While such materially decomposed images contain clinically pertinent information, they typically result in a lower signal to noise ratio (SNR) than conventional computed tomography images. Existing techniques that attempt to increase the signal in such images are often accompanied by undesired radiation dosages. Accordingly, a variety of techniques have been developed that attempt to reduce the noise in the reconstructed images. However, such techniques have fallen short of reducing the noise to acceptable levels. In addition, many noise reduction techniques eliminate noise while introducing undesirable artifacts that contaminate the materially decomposed images. Accordingly, techniques are needed to overcome the problems associated with DE image reconstruction. The techniques described herein are intended to address one or more of these problems associated with DE imaging systems.

BRIEF DESCRIPTION OF THE INVENTION

In a first embodiment, a method includes receiving a first signal representative of X-ray intensity from X-rays produced at a first energy level and a second signal representative of X-ray intensity from X-rays produced at a second energy level. The method also includes reconstructing a first materially decomposed (MD) image of a first basis material and a second MD image of a second basis material based on the first signal and the second signal. The method also includes reducing noise in the first MD image and the second MD image via filtering to produce a filtered first MD image and a filtered second MD image. The method also includes generating a first noise mask by subtracting the first filtered MD image from the first MD image and a second noise mask by subtracting the second filtered MD image from the second MD image. The method also includes processing the first noise mask and the second noise mask to remove or reduce data attributable to non-noise sources to generate a first processed noise mask and a second processed noise mask. The method also includes processing the first MD image with the second processed noise mask and the second MD image with the first processed noise mask to generate a final first MD image substantially and a final second MD image.

In a second embodiment, an imaging system is provided. The imaging system includes an X-ray device adapted to generate X-rays at a first energy level and at a second energy level. The imaging system also includes a detector operable to detect the generated X-rays from the X-ray source. The detector produces a first signal representative of X-ray intensity from X-rays produced at the first energy level and a second signal representative of X-ray intensity from X-rays produced at the second energy level. In addition, the imaging system includes an image processing system coupled to the detector. The image processing system is operable to produce a first materially decomposed (MD) image of a first basis material and a second MD image of a second basis material based on the first signal and the second signal. The image processing system is also operable to generate a first noise mask based on the first MD image and a second noise mask based on the second MD image and to process the first noise mask and the second noise mask to remove or reduce pixels corresponding to non-noise sources. The image processing system is also operable to process the first MD image with the second noise mask and the second MD image with the first noise mask after the noise masks have been processed to remove or reduce pixels corresponding to structure.

In a third embodiment, a method includes acquiring a first set of image data representative of X-ray intensity from X-rays produced at a first energy level and a second set of image data representative of X-ray intensity from X-rays produced at a second energy level. The method also includes generating a first noise mask for a first basis material and a second noise mask for a second basis material based on the respective first set of image data and the second set of image data. The method also includes removing pixels corresponding to cross contaminating structural information from at least the second noise mask. The method also includes generating a first MD image of the first basis material using the first set of image data and the second set of image data. The method also includes processing the first MD image with the second noise mask after removal of the cross contaminating structural information from the second noise mask.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is a flow chart illustrating a correlated structure removal method that may be used to reduce noise in materially decomposed (MD) images in accordance with an embodiment of the present technique;

FIG. 4 depicts a noise mask plot illustrating the effects of the correlated structure removal method of FIG. 3 when applied to a data set;

DETAILED DESCRIPTION OF THE INVENTION

As described in detail below, embodiments of a dual-energy (DE) imaging system and techniques are provided for producing materially decomposed (MD) images that are substantially free of cross contamination, i.e., pixels corresponding to a first material being present in an image depicting a second material and vice versa. Accordingly, methods and devices are provided that may be used to reduce contaminating structural information from one or more noise masks. That is, information corresponding to non-noise sources, i.e., not noise, may be removed or reduced from the one or more noise masks such that the noise masks contain noise and not the desired signal (e.g. signal attributable to blood vessels, iodine, soft tissues, bones, etc.). In one embodiment, a correlated structure removal implementation exploits the negative correlation between noise contained in a first noise mask and noise contained in a second noise mask to eliminate structure contaminating pixels from the noise masks. In another embodiment, a segmentation implementation utilizes segmentation of contamination prone structures to obtain a structure image that may be used to reduce contaminating structural information contained in the noise masks. Still further embodiments include optimal energy implementations that exploit equations describing the signal to noise ratio in MD images to reduce noise in the MD images. The foregoing approaches may be used alone or in combination to generate MD images with reduced cross contamination. That is, such approaches may be employed to generate one or more MD images where the quantity of pixels corresponding to artifacts from cross contamination is reduced as compared to traditional systems. Although the embodiments illustrated herein are described in a medical imaging context, it should be noted that the presently contemplated techniques may also be applicable in security or quality control contexts.

Figure 1:
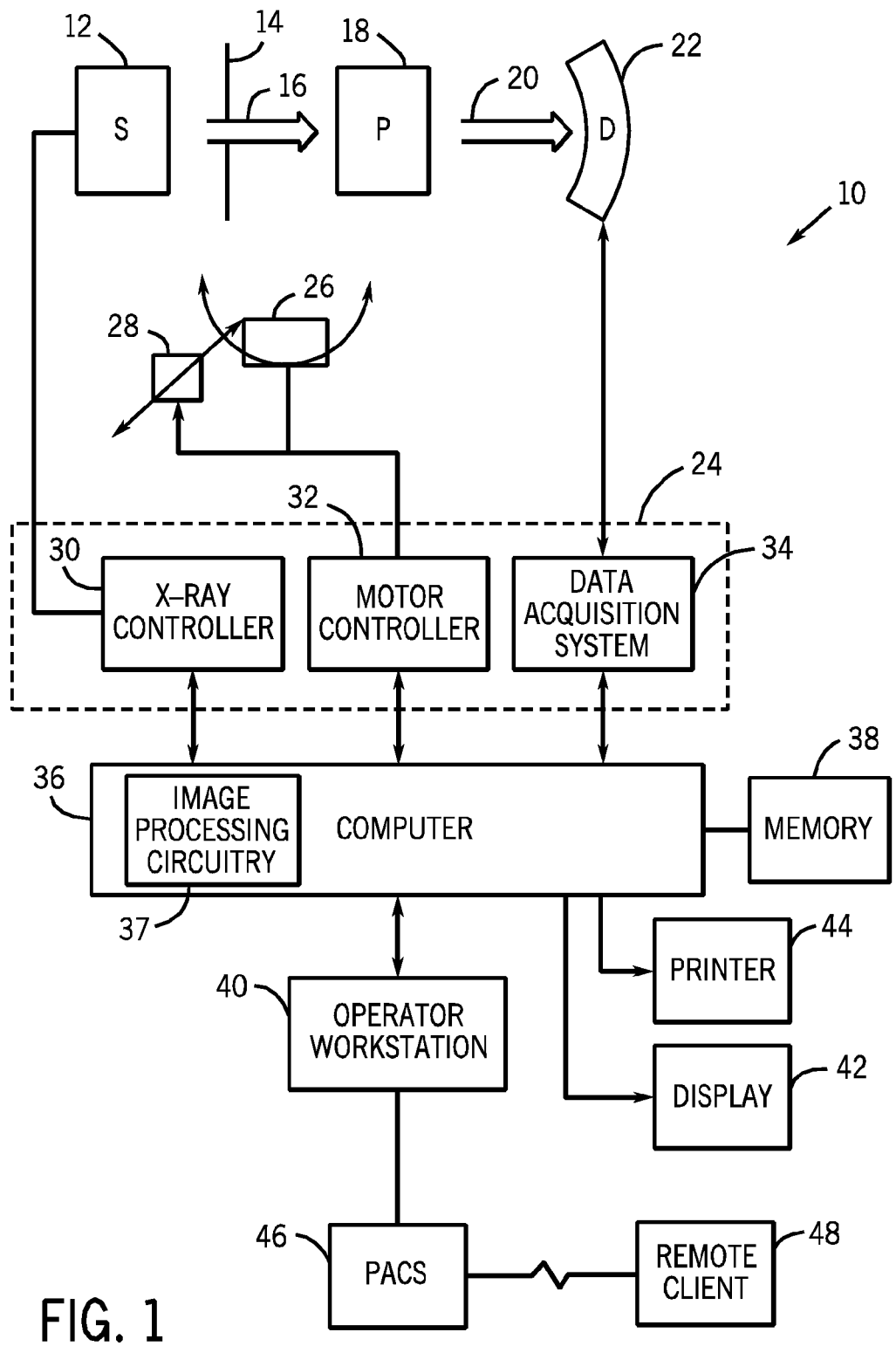
FIG. 1 is a perspective view of a dual-energy (DE) X-ray imaging system in accordance with an embodiment of the present technique.

Turning now to the drawings, FIG. 1 illustrates a dual-energy X-ray imaging system 10. In the illustrated embodiment, the dual-energy X-ray imaging system 10 is a digital X-ray system that is designed to both acquire and process image data for display in accordance with the present techniques. The system 10 is capable of acquiring dual-energy digital X-ray images. In other words, the system 10 is capable of acquiring projection data of a region of interest using X-rays having a first energy level (e.g., high energy) and then acquiring projection data of the region of interest using X-rays having a second, different energy level (e.g., low energy). Furthermore, the dual-energy X-ray imaging system 10 is capable of producing separate images of different basis materials (e.g., bone, water, and so forth) using the X-rays of differing energy levels. That is, the first basis material and the second basis material have different absorption characteristics for the low energy X-rays and the high energy X-rays, enabling the system 10 to distinguish the absorption of X-rays caused by the first basis material and the absorption caused by the second basis material. Such features allow the system 10 to be operable to produce both high energy projections and low energy projections, which may be decomposed (based on these differential absorption characteristics) to produce basis pair material images (e.g., water and bone, water and iodine, iodine and calcium, etc.) for further analysis of the desired anatomy. Furthermore, though the illustrated imaging system 10 is discussed in the context of medical imaging, the techniques and configurations discussed herein are applicable in other non-invasive imaging contexts, such as security screening or industrial nondestructive evaluation of manufactured parts.

It should be noted that although such a dual-energy system is described in the foregoing description, the concepts are equally applicable to any multiple energy system (e.g., any system operating at more than two energy levels) as well. Furthermore various methodologies may be used in practice for generating image data at different energy levels. For example, the system 10 may acquire projection data at a variety of angular positions. With the system 10 in each position, image data at both energy levels may be acquired, or the various positions may be traversed to acquire image data at one energy level, and then the same positions may be repeated to acquire image data at the second energy level. Still further, if the system includes a detector capable of acquiring image data at two different energy levels simultaneously, combined acquisition at the energy levels may be performed. Again, embodiments of the present technique may be used in conjunction with any such system that may be configured to allow the separation of basis materials into separate images.

In the embodiment illustrated in FIG. 1, the CT imaging system 10 includes an X-ray source 12. The source 12 may be positioned proximate to a collimator 14. The collimator 14 may consist of one or more collimating regions, such as lead or tungsten shutters, for each emission point of the source 12. The collimator 14 typically defines the size and shape of the one or more X-ray beams 16 that pass into a region in which a subject 18, such as a human patient, is positioned. Each X-ray beam 16 may be generally fan-shaped or cone-shaped, depending on the configuration of the detector array and/or the desired method of data acquisition, as discussed below. An attenuated portion 20 of each X-ray beam 16 passes through the subject 18 and impacts a detector array, represented generally at reference numeral 22.

The illustrated system 10 may include one or more collimators 14 or filters that shape or limit an emitted stream of radiation directed toward a region in which the subject 18 is positioned. However, in some embodiments, the system 10 may not include a collimator, and images may be obtained using the full field of view of the system 10. Alternatively, in certain embodiments, the field of view of the system 10 may be reduced by using the collimator 14 to reduce the spread of X-rays produced by the X-ray source 12. The collimator 14 can be selectively placed over the X-ray source 12 when desired or the collimator 14 may be kept disposed over the X-ray source 12. Additionally, the collimator 14 may be adjustable so that full (or wide) field of view and reduced (or narrow) field of view images may be obtained with the collimator disposed over the X-ray source 12. It should be noted that the present techniques may be used in an imaging system having a standard collimator, a slit collimator, any other suitable collimator, or no collimator at all.

The detector 22 is generally formed by a plurality of detector elements that detect the X-ray beams 16 after they pass through or around the subject 18. Each detector element produces an electrical signal that represents the intensity of the X-ray beam 16 incident at the position of the detector element when the beam strikes the detector 22. Alternatively, each element of detector 22 may count incident photons in the X-ray beam 16 and may also determine their energy. Typically, the X-ray beam 16 is generated and the corresponding electrical signals are acquired at a variety of angular positions around the subject of interest so that a plurality of radiographic projection views can be collected. The electrical signals are acquired and processed to reconstruct an image that is indicative of the features within the subject 18, as discussed in further detail below.

It should be noted that the digital X-ray detector 22 may be any detector that is operable to perform dual-energy X-ray imaging. For instance, the digital X-ray detector 22 may be an amorphous silicon flat panel that has the ability to acquire two images in rapid succession. Additionally, the detector 22 may include energy discriminative detector materials that are capable of separating X-ray photons from one acquisition into two energy bins. Such detectors may be useful in acquiring data via energy discrimination or photon counting approaches. That is, the digital detector 22 may be capable of facilitating image acquisition speeds that enable the acquisition of high and low energy images with large energy separation (mean energy separations in spectra as high as approximately 90 keV), which may translate to improved image subtraction. In one embodiment, the X-ray detector 22 converts the X-ray photons received on its surface to lower energy photons, and subsequently to electric signals, which are acquired and processed to reconstruct one or more images of the features within the subject.

A system controller 24 commands operation of the imaging system 10 to execute examination protocols and to process the acquired data. The source 12 is typically controlled by the system controller 24. Generally, the system controller 24 furnishes power, focal spot location, control signals and so forth, for the CT examination sequences. The detector 22 is coupled to the system controller 24, which commands acquisition of the signals generated by the detector 22. The system controller 24 may also execute various signal processing and filtration functions, such as initial adjustment of dynamic ranges, interleaving of digital image data, and so forth. In the present context, system controller 24 may also include signal-processing circuitry and associated memory circuitry. As discussed in greater detail below, the associated memory circuitry may store programs and/or routines executed by the system controller 24 or a processor-based system in communication with the system controller 24, such as programs or routines for implementing the presently disclosed techniques. Further, the memory circuitry of the system controller 24 may also store configuration parameters, image data, and so forth. In one embodiment, the system controller 24 may be implemented as all or part of a processor-based system such as a general purpose or application-specific computer system.

In the illustrated embodiment of FIG. 1, the system controller 24 may control the movement of a linear positioning subsystem 28 and a rotational subsystem 26 via a motor controller 32. In an embodiment where the imaging system 10 includes rotation of the source 12 and/or the detector 22, the rotational subsystem 26 may rotate the source 12, the collimator 14, and/or the detector 22 about the subject 18. It should be noted that the rotational subsystem 26 might include a gantry comprising both stationary components (stator) and rotating components (rotor). The linear positioning subsystem 28 may enable the subject 18, or more specifically a patient table that supports the subject 18, to be displaced linearly. Thus, the patient table may be linearly moved within the gantry or within an imaging volume (e.g., the volume located between the source 12 and the detector 22) and enable the acquisition of data from particular areas of the subject 18 and, thus the generation of images associated with those particular areas. Additionally, the linear positioning subsystem 28 may displace the one or more components of the collimator 14, so as to adjust the shape and/or direction of the X-ray beam 16. In embodiments comprising a stationary source 12 and a stationary detector 22, a mechanical rotational subsystem may be absent, with emitters spaced at different angular locations about the subject instead being activated at different times to allow acquisition of projections at different angles. Similarly, in embodiments in which the source 12 and the detector 22 are configured to provide extended or sufficient coverage along the z-axis (i.e., the axis associated with the main length of the subject 18) and/or linear motion of the subject is not required, the linear positioning subsystem 28 may be absent.

The source 12 may be controlled by an X-ray controller 30 disposed within the system controller 24. The X-ray controller 30 may be configured to provide power and timing signals to the source 12. In addition, in some embodiments the X-ray controller 30 may be configured to selectively activate the source 12 such that tubes or emitters at different locations within the system 10 may be operated in synchrony with one another or independent of one another.

Further, the system controller 24 may comprise a data acquisition system 34. In such an embodiment, the detector 22 is coupled to the system controller 24, and more particularly to the data acquisition system 34. The data acquisition system 34 receives data collected by readout electronics of the detector 22. The data acquisition system 34 typically receives sampled analog signals from the detector 22 and converts the data to digital signals for subsequent processing by a processor-based system, such as a computer 36. Alternatively, in other embodiments, the detector 22 may convert the sampled analog signals to digital signals prior to transmission to the data acquisition system 34.

In the depicted embodiment, a computer 36 is coupled to the system controller 24. The data collected by the data acquisition system 34 may be transmitted to the computer 36 for subsequent processing and reconstruction. For example, the data collected from the detector 22 may undergo pre-processing and calibration at the data acquisition system 34 and/or the computer 36 to produce representations of the line integrals of the attenuation coefficients of the subject 18 and the scanned objects. In one embodiment, the computer 36 contains image-process sing circuitry 37 for processing and filtering the data collected from the detector 22. The processed data, commonly called projections, may then be reconstructed by the image processing circuitry 37 to form an image of the subject 18 and/or the scanned area. In one implementation, the projections are reconstructed into noise reduced materially decomposed (MD) images, such as in accordance with the techniques discussed herein. For example, the image processing circuitry 37 may include instructions for receiving acquired image data, removing noise from the digital data in accordance with the techniques described in detail below, and outputting materially decomposed images that are substantially free of noise and cross contamination via an output device, such as the display 42, a printer 44, or the like. Once reconstructed, the image produced by the system 10 of FIG. 1 may reveal an internal region of interest of the subject 18 which can be used for diagnosis, evaluation, and so forth.

The computer 36 may comprise or communicate with a memory 38 that can store data processed by the computer 36, data to be processed by the computer 36, or routines and/or algorithms to be executed by the computer 36, such as for processing image data in accordance with the present techniques. It should be understood that any type of computer accessible memory device capable of storing the desired amount of data and/or code may be utilized by such a system 10. Moreover, the memory 38 may comprise one or more memory devices, such as magnetic, solid-state, or optical devices, of similar or different types, which may be local and/or remote to the system 10. The memory 38 may store data, processing parameters, and/or computer programs comprising one or more routines or algorithms for performing the iterative reconstruction and/or the artifact correction processes described herein.

The computer 36 may also be adapted to control features enabled by the system controller 24 (i.e., scanning operations and data acquisition). Furthermore, the computer 36 may be configured to receive commands and scanning parameters from an operator via an operator workstation 40 which may be equipped with a keyboard and/or other input devices. An operator may, thereby, control the system 10 via the operator workstation 40. Thus, the operator may observe from the computer 36 the reconstructed image and other data relevant to the system 10, initiate imaging, select and apply image filters, and so forth. Further, the operator may manually identify and/or review features and regions of interest from the reconstructed image. Automated detection algorithms may be applied to aid in identifying and/or manipulating the features or regions of interest.

As illustrated, the system 10 may also include a display 42 coupled to the operator workstation 40. The display 42 may be utilized to observe the reconstructed images, for instance. Additionally, the system 10 may include a printer 44 coupled to the operator workstation 40 and configured to print a copy of the one or more reconstructed images. The display 42 and the printer 44 may also be connected to the computer 36 directly or via the operator workstation 40. Further, the operator workstation 40 may include or be coupled to a picture archiving and communications system (PACS) 46. It should be noted that PACS 46 might be coupled to a remote system 48, radiology department information system (RIS), hospital information system (HIS) or to an internal or external network, so that others at different locations can gain access to the image data.

Although only one operator workstation is depicted, one or more operator workstations 40 may be linked in the system 10 for outputting system parameters, requesting examinations, viewing images, and so forth. In general, displays 42, printers 44, workstations 40, and similar devices supplied within the system 10 may be local to the data acquisition components, or may be remote from these components, such as elsewhere within an institution or hospital, or in an entirely different location, linked to the image acquisition system 10 via one or more configurable networks, such as the Internet, virtual private networks, and so forth. Furthermore, although the previous discussion discloses typical embodiments of the imaging system 10, any other suitable system configuration may be employed to acquire image data and process such data via the techniques described herein.

Figure 2:
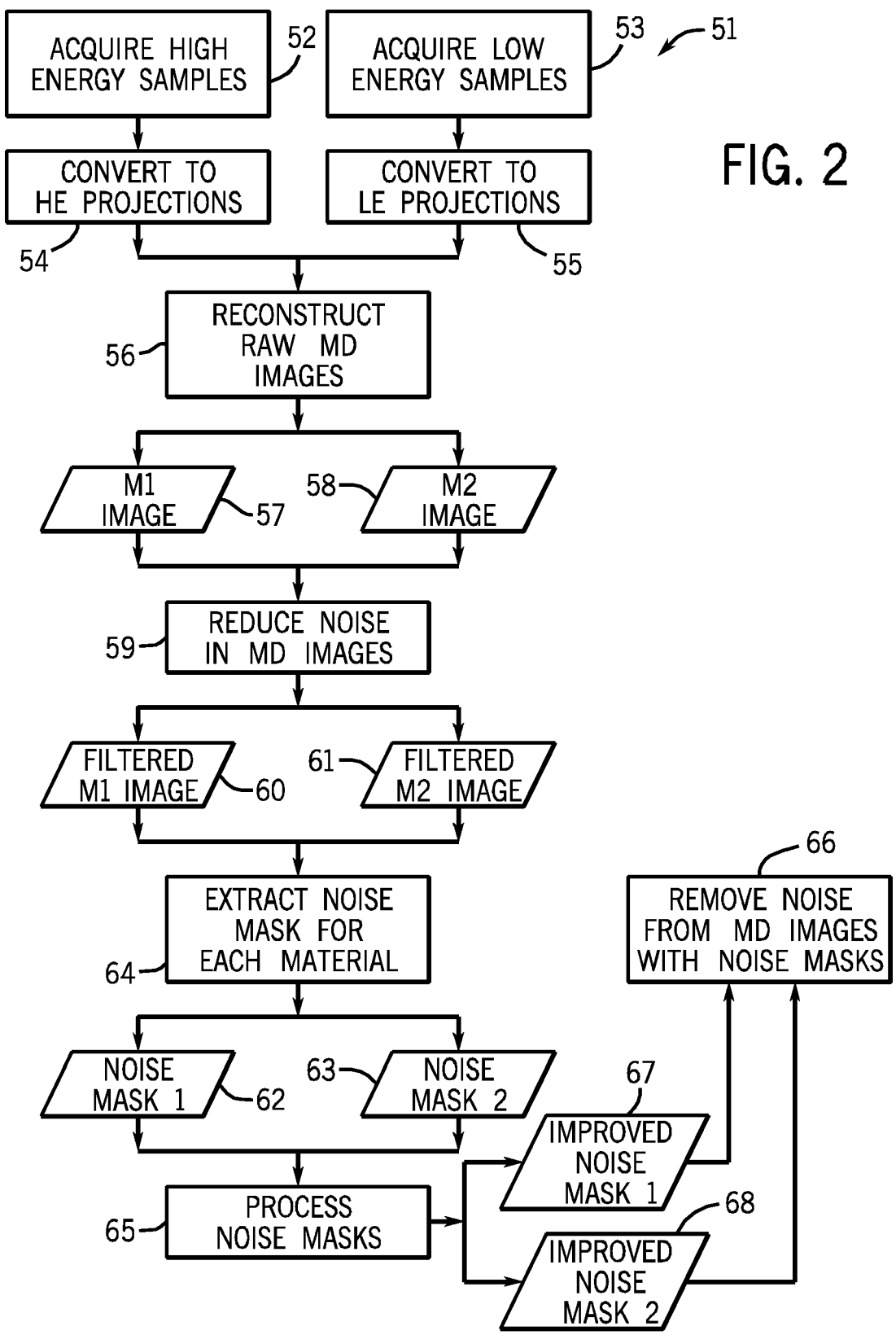
FIG. 2 is a flow chart illustrating a novel DE imaging method in accordance with an embodiment of the present technique.

With the foregoing system discussion in mind, FIG. 2 is a block diagram of a dual energy imaging method 51 that may be used with a system such as that depicted in FIG. 1 to acquire and process digital X-ray data. In accordance with the depicted technique, high energy samples are acquired (block 52) and low energy samples are acquired (block 53). Although in the illustrated embodiment, the method 50 includes acquisition of data at only two energy levels, further embodiments may include data acquisition at any number of energy levels. Furthermore, the data acquisition may occur via any of a variety of dual or multiple energy protocols. For example, the data may be acquired in a rotate-rotate pattern in which a gantry on which the source 12 and detector 22 are disposed rotates one time for each energy level. In one embodiment, the imaging system may acquire data in any of a number of fast kV switching approaches in which the high and low energy data is acquired in an interleaved fashion, e.g., one high—one low, one high—two low, two high—two low, and so forth. Again, any process capable of acquiring data from at least two energy levels may be used in conjunction with the presently contemplated noise reduction techniques.

After acquiring the high and low energy samples, the method 51 includes converting the high energy samples to high energy projections (block 54) and converting the low energy samples to low energy projections (block 55). The projection data may be further used to reconstruct respective raw material decomposed (MD) images (block 56). That is, the low and high energy projections may be used to recreate a separate MD image for each material in a basis material pair. Such MD images typically include information regarding the material density of each of the basis materials and, thus, provide additional information that may be clinically useful. On its own, material decomposition results in images with a much lower SNR than conventional CT images. This can be easily demonstrated by examining the signal to noise ratio (SNR) obtained in the MD images as compared to traditional computed tomography (CT) images. Consider, for example, the basis material pair of water and iodine with atomic numbers of 7.42 and 53, respectively. The SNR of iodine in a low energy image may be defined as:

$$SNR_L(x, y) \propto \frac{\mu_L^I(x, y)}{\sigma_L(x, y)} \quad (1)$$

in which $\mu_L^I$ is the iodine signal contained in the low energy image and $\sigma_L$ is the noise contained in the low energy image. This in turn yields the following formula for the SNR of iodine in the MD image:

$$SNR_{\Delta E}(x, y) \propto \frac{\mu_L^I(x, y) - R^T \mu_H^I(x, y)}{\sqrt{\sigma_L^2(x, y) + (R^T)^2 \sigma_H^2(x, y)}} \quad (2)$$

in which $\mu_H^I$ is the iodine signal contained in the high energy image, $R^T$ is an appropriate weighting constant, and $\sigma_H$ is the noise contained in the high energy image. By comparing (1) and (2) and considering the fact that $\mu_L^I$ and $\mu_H^I$ are approximately equal for many energy levels, it may be concluded that the SNR of iodine in the MD image is less than the SNR of iodine in the low energy image as described by the following equation:

$$SNR_{\Delta E}(x,y) \ll SNR_L. \quad (3)$$

Therefore, MD images 57, 58 may include significantly more noise than low energy or high energy images that have not been materially decomposed.

Although the reconstructed MD images 57, 58 contain reduced amounts of noise compared to the high and low energy images, the MD images may still contain quantum noise associated with X-ray fluctuations and the like. Accordingly, the amount of noise contained in the MD images is reduced (block 59) as part of the method 50. Such a reduction in noise may include high pass filtering each of the raw MD images 57 and 58. However, it should be noted that in certain embodiments of the present disclosure, any of a variety of image space smoothing filters, such as anisotropic diffusing filters, non-sharp masking filters, gradient-based filters, median filters, or the like, may be used. Application of the filter to each MD image generates a filtered MD image 60, 61 for each material. The filtered MD images 60, 61 may be used to extract a noise mask 62, 63 for each material, as represented by block 64. That is, by subtracting the respective filtered MD image from the corresponding raw MD image for each material, a noise mask that contains all the filtered noise and structural information related to the material may be generated for each material. For example, a raw MD water image minus the filtered MD water image yields the water noise mask. The water noise mask then includes the noise filtered from the water image as well as structures and vessels associated with the water image. Likewise, a raw MD iodine image minus the filtered iodine image yields the iodine noise mask. The iodine noise mask then includes the noise filtered from the iodine image as well as structures and vessels associated with the iodine image.

The covariance between the noise contained in the first MD image (i.e., the first noise mask minus the structural features) and the noise contained in the second MD image (i.e., the second noise mask minus the structural features) may be defined by:

$$COV(\sigma_{m1}, \sigma_{m2}) = \left(\frac{\partial \sigma_{m1}}{\partial \mu_L}\right)\left(\frac{\partial \sigma_{m2}}{\partial \mu_L}\right) \cdot \sigma_L^2 + \left(\frac{\partial \sigma_{m1}}{\partial \mu_H}\right)\left(\frac{\partial \sigma_{m2}}{\partial \mu_H}\right) \cdot \sigma_H^2 \quad (4)$$

in which $\sigma_{m1}$ is the noise contained in the MD image for the first material, $\sigma_{m2}$ is the noise contained in the MD image for the second material, and $\sigma_H$ is the noise contained in the high energy image. Thus, the noise contained in the first MD image is negatively correlated with the noise contained in the second MD image, as represented by the following equation:

$$COV(\sigma_{m1}, \sigma_{m2}) < 0. \quad (5)$$

Such a negative correlation implies that removal of the structural features from the noise masks 62, 63 may enable the noise masks 62, 63 to be used to reduce or remove noise in the complementary MD image of a material basis pair. Accordingly, in method 50, the noise masks 62, 63 for each material are processed (block 65) by reducing or removing the residual structural features from each of the noise masks 62, 63 in accordance with the cross-contamination removal techniques (i.e., techniques for removing signal associated with one material from MD images of the other material) described herein. For example, such processing of the noise masks may include eliminating some or all of the pixels in each noise mask that correspond to structural artifacts. Once the structural features are removed from each noise mask, noise may be removed (block 66) from the MD images 57, 58 using processed noise masks 67, 68. That is, after cross contamination has been removed from the noise masks, the processed noise masks 67, 68 may be used to remove or reduce the noise contained in the complementary material images.

For example, consider a water and iodine basis material pair. The water noise mask, which contains the noise in the water image as well as contaminating structural information, and the iodine noise mask, which contains the noise in the iodine image as well as contaminating structural information, are obtained. Next, the contaminating structural information is reduced or removed from both the water noise mask and the iodine noise mask to eliminate features that may cause cross contamination, thus yielding a processed (structure-reduced or structure-free) water noise mask and iodine noise mask. The processed water noise mask may then be added to the iodine MD image to cancel out noise. Similarly, the processed iodine noise mask may be added to the water MD image to cancel out noise. The result of such a process may be an iodine MD image and a water MD image that are substantially free of artifacts due to cross contamination. That is, embodiments of the present techniques may generate MD images that are substantially free of cross contamination.

FIG. 3 is a block diagram of an embodiment of a noise mask processing method that may be used to reduce or eliminate structure information (e.g., blood vessels, iodine, soft tissue, bones, etc.) from the noise masks 62, 63. The illustrated embodiment includes a correlated structural removal method 69 that is used in conjunction with a dual energy X-ray imaging system. As before, however, it should be noted that the present approaches may be used with any multiple energy imaging system (i.e., the approaches are not limited to two energy levels). In accordance with the present implementation, the noise mask of the first material is plotted or mapped against the noise mask of the second material (block 70). The plot or map may be analyzed, and positively correlated points are removed (block 72) from each of the noise masks 62, 63. That is, since positively correlated points appear in both noise masks, they likely represent structure, not noise, and, accordingly, such points may be removed from the noise masks 62, 63. The following equation dictates the identification and removal of such pixels:

$$\begin{cases} P_{m1}(x, y) = 0 \\ P_{m2}(x, y) = 0, \end{cases} \text{if } P_{m1}(x, y) \times P_{m2}(x, y) > 0. \quad (6)$$

in which $P_{m1}$ is a pixel in the first noise mask, 62, and $P_{m2}$ is a pixel in the second noise mask, 63. Such positively correlated pixels may be due to structures such as bone, outer patient contour, bow gas contour, and so forth.

Next, points that are approximately negatively correlated are shifted (block 74) in value to force a negative correlation. Since such points generally appear opposite in value but slightly unequal in amount in the noise mask plot generated above, these points are likely noise that was influenced by nearby structures. Therefore, such points are not discarded as structure, but rather, these points are slightly altered in value to accommodate for the structural influence and to minimize the influence of the structures. The following equation is one approach to guide such a process:

$$\begin{cases} P_{m1}(x, y) = \dfrac{\pm 1}{|P_{m1}(x, y)| + |P_{m2}(x, y)|} \\ P_{m2}(x, y) = \dfrac{\mp 1}{|P_{m1}(x, y)| + |P_{m2}(x, y)|}, \end{cases} \quad (7)$$

if $P_{m1}(x, y) \times P_{m2}(x, y) < 0$ and $(|P_{m1}(x, y)| - |P_{m2}(x, y)|) > T.$ in which T is a threshold value determined empirically or statistically based on a given application.

Finally, negatively correlated points are retained (block 76) in the noise masks. As shown in equation 5 above, such negatively correlated points represent the noise contained in the MD images, and, therefore, such points belong in the noise masks. Accordingly, the following equation describes how perfectly negatively correlated pixel values that lie within a given tolerance, T, remain unchanged:

$$\begin{cases} P_{m1}(x, y) = P_{m1}(x, y) \\ P_{m2}(x, y) = P_{m2}(x, y), \end{cases} \quad (8)$$

if $P_{m1}(x, y) \times P_{m2}(x, y) < 0$ and $(|P_{m1}(x, y)| - |P_{m2}(x, y)|) < T.$ The correlated structure removal method 69 of FIG. 3 may be better understood by considering the noise mask plot 80 illustrated in FIG. 4. The plot 80 includes a noise mask 1 (m1) axis 82, a noise mask 2 (m2) axis 84, a first quadrant (I) 86, a second quadrant (II) 88, a third quadrant (III) 90, and a fourth quadrant (IV) 92. Theoretically, pixels that fall on a line defined by m1=−m2 are perfectly negatively correlated. However, in imaging applications of the presently disclosed techniques, pixels may be said to be negatively correlated if the pixels lie between boundary line 94 and boundary line 96, thus falling within a predetermined threshold 98. In some embodiments, the threshold 98 may be less than 2 to 5, 2 to 10, or an even greater number of pixels, and the appropriate threshold 98 may be determined based on the given application. For example, the threshold may be derived based on statistical analysis or estimated based on empirical determinations. In the illustrated embodiment, pixel 100 and pixel 102 lie within the threshold 98, and, thus, are classified as negatively correlated and remain unchanged in accordance with method 66.

Pixel 104 and pixel 106 that lie in first quadrant 86 and third quadrant 90, respectively, are positively correlated and are, therefore, removed (FIG. 3, block 72). That is, pixel 104 and pixel 106, being positively correlated, likely represent structural components that appear in both noise mask 1 and noise mask 2. Therefore, the value of pixel 104 and the value of pixel 106 are subtracted from both noise mask 1 and noise mask 2. Such an operation effectively results in the movement of pixel 104 to the origin of plot 80, as indicated by arrow 108, and the movement of pixel 106 to the origin of plot 80, as indicated by arrow 110. In this way, pixels 104 and 106 were identified as corresponding to contaminating structure, not noise, and were therefore removed from m1 and m2.

Pixel 112 and pixel 114, which lie in second quadrant 88 represent generally negatively correlated pixels that are not within the established boundary lines 94, 96. In the depicted embodiment, the pixels 112, 114 lie on opposite sides of boundary lines 94 and 96 by roughly the same distance. In such an example, the pixels 112 and 114 are likely representative of features that exist in only one of the MD images of a material basis pair. As shown by arrows 116 and 118, pixels 112 and 114, respectively, are shifted (FIG. 3, block 74) to improve negative correlation and place the pixels within boundary lines 94 and 96. Likewise, pixel 120 and pixel 122, which lie in fourth quadrant 92 lie on opposite sides of boundary lines 94 and 96 but are only approximately equal in amount. Accordingly, as shown by arrows 124 and 126, pixels 120 and 126, respectively, are shifted to improve negative correlation and place the pixels within boundary lines 94 and 96. In this manner, pixels in the noise masks 62, 63 may be processed to remove structure and to clarify the noise relationship characteristics of certain pixels that are outside the specified noise threshold trend line.

Figure 5:
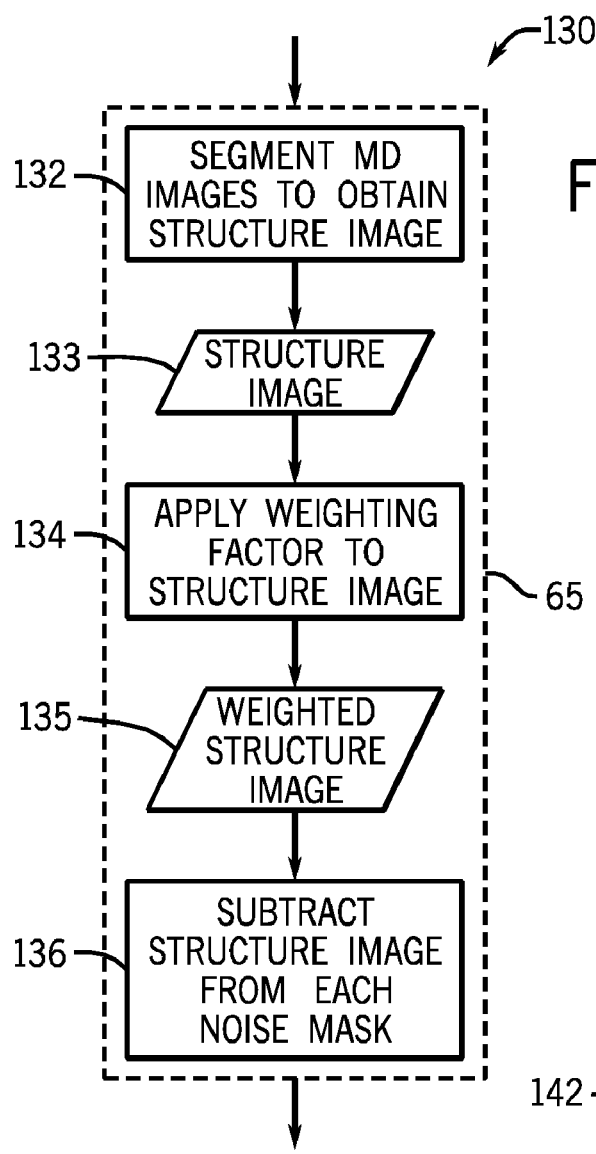
FIG. 5 is a flow chart illustrating a segmentation noise reduction method that may be used to reduce noise in materially decomposed (MD) images in accordance with an embodiment of the present technique.

FIG. 5 is a block diagram of an additional embodiment of a noise mask processing method that may be used to reduce or eliminate structural information (e.g., blood vessels, iodine, soft tissues, bones, etc.) from the noise masks 62, 63. The illustrated embodiment includes a segmentation method 130 that is used in conjunction with a dual energy X-ray imaging system. The segmentation method 130 may include any of a variety of segmentation approaches, such as a threshold based segmentation. As with the previously discussed approach, the present approach may be used with any multiple energy imaging system. In accordance with one implementation, both MD images 57, 58 are segmented (block 132) to obtain a structure image 133. That is, contamination prone structures (e.g., structures that exceed an imposed size limit) may be segmented in the MD images 57, 58 to identify the structure image 133. Next, an appropriate weighting factor is applied (block 134) to the structure image 133. Such a weighting factor may be determined by any of a variety of suitable methods based on any suitable principle. For example, in one embodiment, the weighting factor may be determined based on the strength of attenuation of each of the segmented structures. Finally, a weighted structure image 135 is subtracted from each noise mask 62, 63 to obtained processed (e.g., structure-reduced or structure-removed) noise masks 67, 68.

Figure 6:
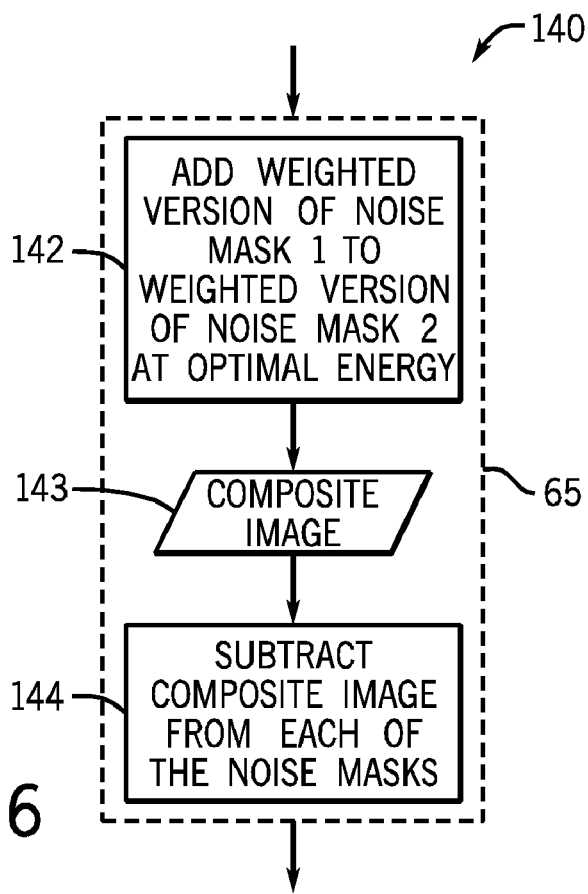
FIG. 6 is a flow chart illustrating an optimal energy method that may be used to reduce noise in materially decomposed (MD) images in accordance with an embodiment of the present technique.

FIG. 6 is a block diagram of another embodiment of a noise mask processing method that may be used to reduce or eliminate non-noise sources (e.g., blood vessels, iodine, soft tissues, bones, etc.) from the noise masks 62, 63. The illustrated embodiment includes a method 140 that is used in conjunction with a dual or multi-energy X-ray imaging system. In accordance with the present approach, a weighted version of the first noise mask is added (block 142) to a weighted version of the second noise mask at a specified energy level to generate a composite image 143 (e.g., a monochromatic image or synthetic monochromatic image). At the specified energy level, the composite image 143 (i.e., the first noise mask plus the second noise mask) contains minimal noise. Accordingly, the composite image 143 at the specified energy level contains contaminating structural information. Once obtained, the composite image 143 is subtracted (block 144) from each of the noise masks 62, 63.

Figure 7:
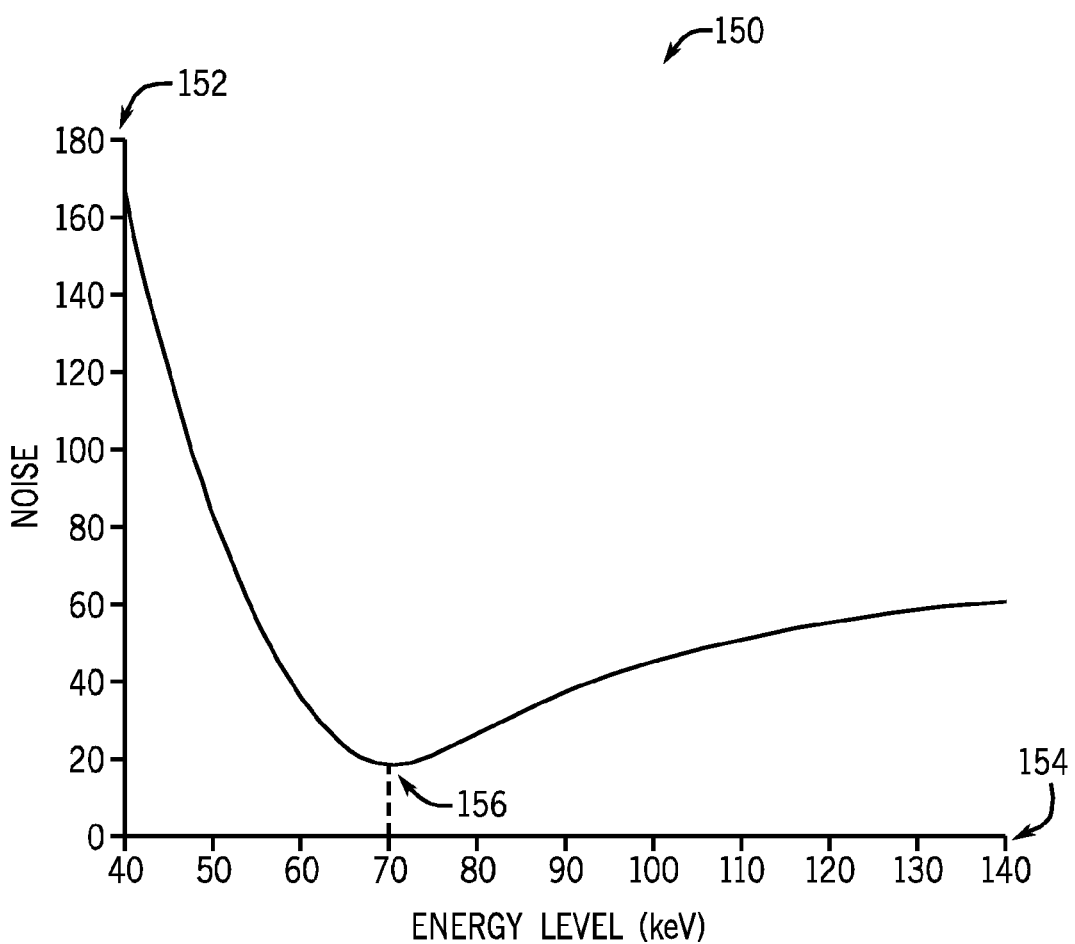
FIG. 7 depicts an optimal energy plot that illustrates an optimal energy for a sample data set.

The principle behind the method 140 may be better understood by considering FIG. 7, which illustrates an energy plot 150. As noted above, equation (2) described herein, provides an expression for the signal to noise ratio in an MD image.

Further, there exits an energy level at which equation (2) reaches a global maxima. That is, there exists an energy level at which the signal in an MD image is maximized with respect to the noise in the MD image. At this optimal energy/minimal noise level, the first noise mask may be added (FIG. 6, block 142) to the second noise mask, thereby generating a composite image 143 that contains mostly structural information that would cross contaminate the MD images if not removed from the noise masks 62, 63. For example, such an optimal energy level/minimal noise is illustrated in plot 150 at minima 156. In particular, the energy plot 150 includes a noise axis 152 and an energy level axis 154. As shown in the plot 150, the amount of noise is very high at certain energy levels (e.g., 40 keV) but reaches a global minima 156 at 70 keV. Therefore, in this example, 70 keV would be the optimal energy level at which addition (block 142) of the weighted noise masks would occur. That is, for the noise masks 62, 63 in this example, at 70 keV, the addition of the noise masks 62, 63 will result in a composite image 143 that contains the less noise and more structural information, which may in turn be removed from the noise masks 62, 63.

It should be noted that an optimal energy plot 150 need not be generated. Rather, in one embodiment, the method 140 may be described by the following equation:

$$\begin{cases} P'_{m1}(x, y) = \sum_{k=0}^{K} \alpha_k D(x, y)^k = \sum_{k=0}^{K} \alpha_k \left( P_{m1}(x, y) + \frac{\mu_{m2}(E_0)}{\mu_{m1}(E_0)} P_{m2}(x, y) \right)^k \\ P'_{m2}(x, y) = \sum_{k=0}^{K} \beta_k D(x, y)^k = \sum_{k=0}^{K} \beta_k \left( P_{m1}(x, y) + \frac{\mu_{m2}(E_0)}{\mu_{m1}(E_0)} P_{m2}(x, y) \right)^k \end{cases} \quad (9)$$

in which D is a contamination map including contamination prone structures, $P'_{m1}$ is a mapping function of the first noise mask, $P'_{m2}$ is a mapping function of the second noise mask, $\alpha_k$ and $\beta_k$ are coefficients of the polynomials, $E_0$ is the optimal energy, and $\mu_{m1}$ and $\mu_{m2}$ are the attenuation coefficients of the first and second basis materials, respectively. In this embodiment, polynomials may be used to determine a mapping function between the contamination map and the noise masks. In such an embodiment, the relationship modeled by the equation (9) may be used to solve for the energy level corresponding to the global noise minima. However, in other embodiments, any of a variety of models may be used to approximate such a relationship.

The systems, methods, and techniques described herein have been presented as separate embodiments of the noise mask processing step 65 of FIG. 2. However, it should be noted that the correlated structure removal method 69, the segmentation method 130, and the optimal energy method 140 may be employed alone or in combination with one or more of the other methods during implementation. That is, in certain embodiments, the noise mask optimization step 65 may implement one or more of method 69, method 130, method 140 as described herein. For example, in one embodiment, the noise mask processing step 65 may implement method 69 and method 130 as described herein. In another embodiment, the noise mask processing step may implement method 130 and method 140.

Technical effects of the invention include generating a noise mask in which some or all of the effects of structure are reduced and removed. Such a noise mask may then be used in generating materially decomposed images in which noise is reduced. Technical effects of one embodiment include generating noise masks in which the effects of structure are reduced or eliminated based upon a correlation relationship between structure and/or noise features within two or more noise masks of interest. Technical effects of another embodiment include generating noise masks in which the effects of structure are reduced or eliminated based upon a structure image segmented from the one or more of the noise masks. Technical effects of another embodiment include generating noise masks in which the effects of structure are reduced or eliminated by subtracting a synthetic structure image generated at an energy level corresponding to minimal noise.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
receiving a first signal representative of X-ray intensity from X-rays produced at a first energy level and a second signal representative of X-ray intensity from X-rays produced at a second energy level;
reconstructing a first materially decomposed (MD) image of a first basis material and a second MD image of a second basis material based on the first signal and the second signal;
reducing noise in the first MD image and the second MD image via filtering to produce a filtered first MD image and a filtered second MD image;
generating a first noise mask by subtracting the first filtered MD image from the first MD image and a second noise mask by subtracting the second filtered MD image from the second MD image;
processing the first noise mask and the second noise mask to remove or reduce data attributable to non-noise sources to generate a first processed noise mask and a second processed noise mask;
processing the first MD image with the second processed noise mask and the second MD image with the first processed noise mask to generate a final first MD image and a final second MD image.

2. The method of claim 1, wherein processing the first noise mask and the second noise mask to remove or reduce data attributable to non-noise sources comprises generating a plot or map of the first noise mask versus the second noise mask.

3. The method of claim 2, comprising removing positively correlated points on the plot or map from the first noise mask and the second noise mask.

4. The method of claim 2, comprising shifting non-positively correlated points in the first noise mask and the second noise mask that are within a specified tolerance.

5. The method of claim 1, wherein processing the first noise mask and the second noise mask to remove or reduce data attributable to non-noise sources comprises segmenting the first MD image and the second MD image to obtain a structure image and subtracting the structure image from the first noise mask and the second noise mask.

6. The method of claim 1, wherein processing the first noise mask and the second noise mask to remove or reduce data attributable to non-noise sources comprises adding a weighted version of the first noise mask to a weighted version of the second noise mask at a specified energy to generate a composite image and subtracting the composite image from the first noise mask and the second noise mask.

7. The method of claim 1, wherein the final first MD image and the final second MD image are substantially free of cross contamination.

8. The method of claim 1, wherein reducing noise in the first MD image and the second MD image via filtering comprises applying one or more of a high pass filter, an anisotropic diffusing filter, a non-sharp masking filter, a gradient based filter, a median filter, or other suitable image space smoothing filter.

9. The method of claim 1, wherein processing the first MD image with the second processed noise mask and the second MD image with the first processed noise mask comprises adding the first processed noise mask to the second MD image and adding the second processed noise mask to the first MD image.

10. An imaging system, comprising:
an X-ray device adapted to generate X-rays at a first energy level and at a second energy level;
a detector operable to detect the generated X-rays from the X-ray source, wherein the detector produces a first signal representative of X-ray intensity from X-rays produced at the first energy level and a second signal representative of X-ray intensity from X-rays produced at the second energy level;
an image processing system coupled to the detector, wherein the image processing system is operable to produce a first materially decomposed (MD) image of a first basis material and a second MD image of a second basis material based on the first signal and the second signal, to generate a first noise mask based on the first MD image and a second noise mask based on the second MD image, to process the first noise mask and the second noise mask to remove or reduce pixels corresponding to non-noise sources, and to process the first MD image with the second noise mask and the second MD image with the first noise mask after the noise masks have been processed to remove or reduce pixels corresponding to non-noise sources.

11. The imaging system of claim 10, wherein the image processing system processes the first noise mask and the second noise mask to remove or reduce pixels corresponding to non-noise sources by generating a plot of the first noise mask versus the second noise mask, by removing positively correlated points from the first noise mask and the second noise mask, and by shifting negatively correlated points in the first noise mask and the second noise mask that are outside of a specified tolerance.

12. The imaging system of claim 10, wherein the image processing system processes the first noise mask and the second noise mask to remove or reduce pixels corresponding to non-noise sources by segmenting the first MD image and the second MD image to obtain a structure image and by subtracting the structure image from the first noise mask and the second noise mask.

13. The imaging system of claim 10, wherein the image processing system processes the first noise mask and the second noise mask to remove or reduce pixels corresponding to non-noise sources by adding a weighted version of the first noise mask to a weighted version of the second noise mask at a specified energy to generate a composite image and by subtracting the composite image from the first noise mask and the second noise mask.

14. A method comprising:
acquiring a first set of image data representative of X-ray intensity from X-rays produced at a first energy level and a second set of image data representative of X-ray intensity from X-rays produced at a second energy level;
generating a first noise mask for a first basis material and a second noise mask for a second basis material based on the first set of image data and the second set of image data;
removing pixels corresponding to cross contaminating structural information from at least the second noise mask;
generating a first MD image of the first basis material using the first set of image data and the second set of image data; and
processing the first MD image with the second noise mask after removal of the cross contaminating structural information from the second noise mask.

15. The method of claim 14, filtering at least the first MD image using one or more of a high pass filter, an anisotropic diffusing filter, a non-sharp masking filter, a gradient based filter, a median filter, or other suitable image space smoothing filter.

16. The method of claim 14, wherein the first MD image is substantially free of cross contamination after processing.

17. The method of claim 14, wherein removing pixels corresponding to cross contaminating structural information from at least the second noise mask comprises processing at least the second noise mask via a correlated structural removal method, a segmentation method, an optimal energy method, or a combination thereof.

18. The method of claim 17, wherein the correlated structural removal method comprises generating a plot of the first noise mask versus the second noise mask, removing positively correlated points from the first noise mask and the second noise mask, and shifting negatively correlated points in the first noise mask and the second noise mask are outside of a specified tolerance to within the tolerance.

19. The method of claim 17, wherein the segmentation method comprises segmenting the first MD image and the second MD image to obtain a structure image and subtracting the structure image from at least the second noise mask.

20. The method of claim 17, wherein the optimal energy method comprises adding a weighted version of the first noise mask to a weighted version of the second noise mask at an optimal energy to generate a composite image and subtracting the composite image from at least the second noise mask.

* * * * *